United States Patent
Shibata (10) Patent No.: US 9,626,743 B2
(45) Date of Patent: Apr. 18, 2017

(54) IMAGE STABILIZATION APPARATUS, METHOD OF CONTROLLING THE SAME, IMAGE CAPTURING APPARATUS, LENS APPARATUS, AND STORAGE MEDIUM

(71) Applicant: CANON KABUSHIKI KAISHA, Tokyo (JP)

(72) Inventor: Masahiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 14/636,918

(22) Filed: Mar. 3, 2015

(65) Prior Publication Data

US 2015/0256753 A1  Sep. 10, 2015

(30) Foreign Application Priority Data

Mar. 5, 2014 (JP) ................... 2014-043155
Dec. 11, 2014 (JP) ................... 2014-251075

(51) Int. Cl.
| H04N 5/235 | (2006.01) |
| H04N 5/232 | (2006.01) |
| G02B 27/64 | (2006.01) |
| G06T 5/00 | (2006.01) |

(52) U.S. Cl.
CPC ........... G06T 5/002 (2013.01); H04N 5/2328 (2013.01); H04N 5/23258 (2013.01); G02B 27/646 (2013.01)

(58) Field of Classification Search
CPC ... H04N 5/23251; G02B 27/646; G06T 5/002
See application file for complete search history.

(56) References Cited

U.S. PATENT DOCUMENTS

| 2011/0013031 A1* | 1/2011 | Miyasako | G02B 27/646 348/208.99 |
| 2011/0310484 A1* | 12/2011 | Okamura | G02B 27/646 359/554 |
| 2013/0195434 A1* | 8/2013 | Sakurai | G02B 27/646 396/55 |

FOREIGN PATENT DOCUMENTS

| JP | 2003-202499 A | 7/2003 |
| JP | 2010-004370 A | 1/2010 |

* cited by examiner

*Primary Examiner* — Joel Fosselman
*Assistant Examiner* — Fayez Bhuiyan
(74) *Attorney, Agent, or Firm* — Cowan, Liebowitz & Latman, P.C.

(57) ABSTRACT

An image stabilization apparatus comprises a signal separation unit configured to separate a shake signal into a low frequency band and a high frequency band, a panning determination unit configured to determine, based on an output from the shake detection unit, whether a panning operation is performed, and a control unit configured to control a first image stabilization unit based on the high frequency band and control a second image stabilization unit based on the low frequency band, wherein the apparatus has a first mode in which if the panning determination unit determines that a panning operation is performed, control is performed to make the second image stabilization unit approach a center of correction, and no control is performed to make the first image stabilization unit approach a center.

14 Claims, 6 Drawing Sheets

IMAGE STABILIZATION APPARATUS, METHOD OF CONTROLLING THE SAME, IMAGE CAPTURING APPARATUS, LENS APPARATUS, AND STORAGE MEDIUM

BACKGROUND OF THE INVENTION

Field of the Invention

The present invention relates to a technique of correcting the blur of an image to be captured by using a plurality of correction optical systems.

Description of the Related Art

Recently, an image stabilization function, which not only corrects the blur of an image to be captured caused by camera shake while the user is standing still but also corrects a relatively large blur caused when the user performs shooting with one hand and the large blur of an image to be captured caused when the user performs shooting while walking, has become widespread.

Image stabilization methods include techniques such as an optical image stabilization technique of shifting an optical axis in accordance with blur by optically moving a correction lens and an electronic image stabilization technique of changing a cutout region output from an image captured by an image sensor in accordance with blur.

In order to correct a large blur, an optical image stabilization scheme needs to increase a correction angle, whereas an electronic image stabilization scheme needs to set a large surplus pixel region. Either method needs to expand a correction range. When expanding a correction range, however, the optical image stabilization scheme suffers from a problem that a lens or actuator increases in size or the optical performance deteriorates when the lens is greatly shaken. In addition, the electronic image stabilization scheme suffers from a problem that a reduction in effective region leads to a deterioration in image quality and an increase in the size of an image sensor leads to an increase in power consumption.

In order to solve such problems, Japanese Patent Laid-Open No. 2003-202499 has proposed a method of providing and driving two correction optical systems for image stabilization. In addition, Japanese Patent Laid-Open No. 2010-4370 has proposed a method which provides a correction optical system and an electronic correction system and corrects blur by separating it into a high frequency band and a low frequency band and performing correction for each frequency band using two correction systems.

The technique disclosed in Japanese Patent Laid-Open No. 2010-4370, however, gives no consideration to the movement of camerawork such as panning at the time of moving image shooting. For this reason, the following problem arises.

That is, when the two correction systems are always controlled after the separation of blur into a high frequency component and a low frequency component at the time of a camera operation such as panning, a blur correction residue remains. This is because when panning is detected, an end of correction is reached unless correction on the lower frequency side is inhibited. Upon detection of panning, therefore, it is necessary to change a correction control method so as to inhibit correction. If, however, panning is detected and correction is inhibited while a high frequency component and a low frequency component are separated from each other, a high frequency component is also not corrected. As a result, high frequency blur remains.

SUMMARY OF THE INVENTION

The present invention has been made in consideration of the above problem, and provides an image stabilization apparatus which can obtain a good image stabilization result even at the occurrence of a movement of camerawork such as panning.

According to the first aspect of the present invention, there is provided an image stabilization apparatus comprising: a signal separation unit configured to separate a shake signal output from a shake detection unit into a low frequency band shake signal and a high frequency band shake signal; a panning determination unit configured to determine, based on an output from the shake detection unit, whether a panning operation is performed; and a control unit configured to control a first image stabilization unit which optically corrects image blur based on the high frequency band shake signal and control a second image stabilization unit which optically corrects image blur based on the low frequency band shake signal, wherein the apparatus has a first mode in which if the panning determination unit determines that a panning operation is performed, control is performed to make the second image stabilization unit approach a center of correction of the second image stabilization unit, and no control is performed to make the first image stabilization unit approach a center of correction of the first image stabilization unit.

According to the second aspect of the present invention, there is provided an image stabilization apparatus comprising: a signal separation unit configured to separate a shake signal output from a shake detection unit into a first shake signal and a second shake signal; a panning determination unit configured to determine, based on an output from the shake detection unit, whether a panning operation is performed; and a control unit configured to control a first image stabilization unit which optically corrects image blur based on the first shake signal and control a second image stabilization unit which optically corrects image blur based on the second shake signal, wherein the apparatus has a first mode in which if the panning determination unit determines that a panning operation is performed, control is performed to make the second image stabilization unit approach a center of correction of the second image stabilization unit, and no control is performed to make the first image stabilization unit approach a center of correction of the first image stabilization unit.

According to the third aspect of the present invention, there is provided an image capturing apparatus comprising an image stabilization apparatus defined above and an image sensor.

According to the fourth aspect of the present invention, there is provided a lens apparatus comprising an image stabilization apparatus defined above and the shake detection unit.

According to the fifth aspect of the present invention, there is provided a method of controlling an image stabilization apparatus, the method comprising: a signal separation step of separating a shake signal output from a shake detection unit into a low frequency band shake signal and a high frequency band shake signal; a panning determination step of determining, based on an output from the shake detection unit, whether a panning operation is performed; and a control step of controlling a first image stabilization unit which optically corrects image blur based on the high frequency band shake signal and controlling a second image stabilization unit which optically corrects image blur based on the low frequency band shake signal, wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

According to the sixth aspect of the present invention, there is provided a method of controlling an image stabilization apparatus, the method comprising: a signal separation step of separating a shake signal output from a shake detection unit into a first shake signal and a second shake signal; a panning determination step of determining, based on an output from the shake detection unit, whether a panning operation is performed; and a control step of controlling a first image stabilization unit which optically corrects image blur based on the first shake signal and controlling a second image stabilization unit which optically corrects image blur based on the second shake signal, wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

Further features of the present invention will become apparent from the following description of exemplary embodiments with reference to the attached drawings.

DESCRIPTION OF THE EMBODIMENTS

The embodiments of the present invention will be described in detail below with reference to the accompanying drawings.

First Embodiment

Figure 1:
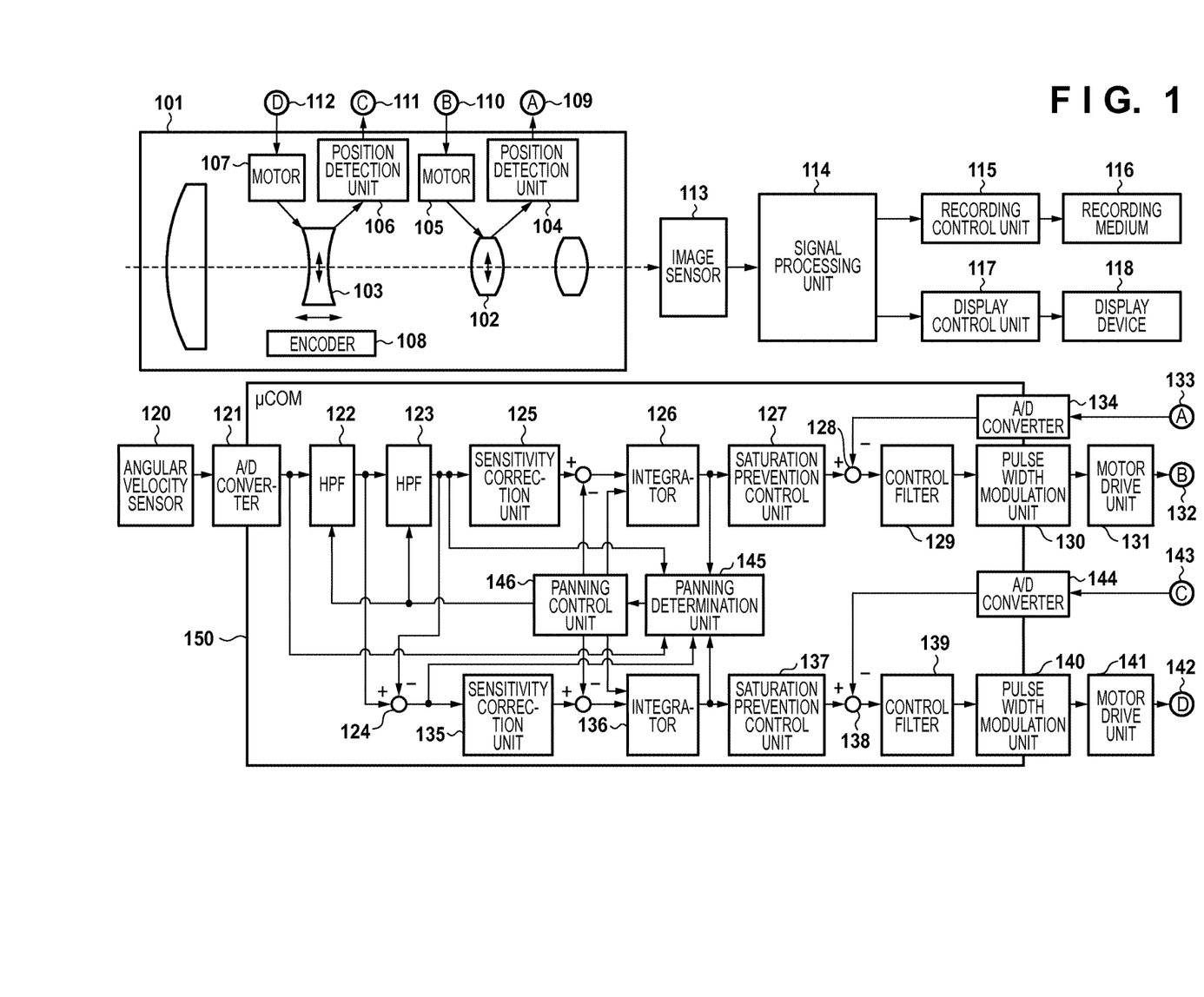
FIG. 1 is a block diagram showing the system configuration of an image capturing apparatus according to the first embodiment of the present invention.

FIG. 1 is a block diagram showing an example of the arrangement of an image capturing apparatus according to the first embodiment of the present invention. Referring to FIG. 1, a shooting optical system 101 is a lens group constituted by a plurality of lenses. The shooting optical system 101 includes two optical image stabilization mechanisms. A shift lens 102 is the first optical image stabilization mechanism, which can change the incident angle of light entering an imaging plane by being moved within a two-dimensional plane perpendicular to the optical axis. A zoom lens 103 is the second optical image stabilization mechanism. The zoom lens 103 changes the magnification of the shooting optical system 101 by being moved in the optical axis direction, and can change the magnification of an image formed on the imaging plane of the image sensor. In addition, the zoom lens 103 can move within a two-dimensional plane perpendicular to the optical axis or spherically rotate about one point on the optical axis, and also functions as an optical image stabilization mechanism. The shift lens 102 and the zoom lens 103 will also be referred to as the first correction optical system and the second correction optical system hereinafter, respectively.

An image sensor 113 photoelectrically converts an optical object image formed via the shooting optical system 101 and outputs the resultant signal as a video signal. For example, a CCD or CMOS sensor is used as the image sensor 113. A signal processing unit 114 is constituted by an analog signal processing circuit and a digital signal processing circuit. The analog signal processing circuit generates an analog imaging signal by performing predetermined processing on the signal obtained by the image sensor 113. For example, the analog signal processing circuit is constituted by a CDS (Correlated Double Sampling) circuit, an AGC (Automatic Gain Control) circuit, and the like. The digital signal processing circuit converts an analog imaging signal into a digital signal by using an A/D converter and generates a digital video signal by performing predetermined signal processing such as gamma correction or white balance correction. In addition, the digital signal processing circuit generates, for example, evaluation signals for AF (Auto Focus) control and AE (Auto Exposure) control.

A recording control unit 115 outputs a video signal supplied from the signal processing unit 114 to a recording medium 116 and makes it record the signal, when an instruction to record the video signal is issued by an operation unit (not shown) used to issue an instruction to start or end recording. The recording medium 116 is an information recording medium such as a semiconductor memory, a magnetic recording medium such as a hard disk or magnetic tape, or the like. A display control unit 117 outputs the video signal supplied from the signal processing unit 114 and causes a display device 118 to display the image. The display device 118 displays an image by using an LCD (Liquid Crystal Display), viewfinder, or the like.

An angular velocity sensor 120 is a sensor unit for detecting the shake of the image capturing apparatus. For example, the angular velocity sensor 120 is formed from a vibration gyroscope or the like, which detects the angular velocity of the overall shake of the image capturing apparatus caused by camera shake or the like and outputs an electrical signal. The angular velocity sensor 120 includes two angular velocity sensors in two axial directions, for example, a rotation axis (Yaw) in the horizontal direction and a rotation axis (Pitch) in the vertical direction, so as to form detection axes perpendicular to each other on one plane perpendicular to the optical axis. The angular velocity sensor 120 separately calculates correction amounts for the respective detected axes to control the first and second correction optical systems in the two axial directions in the horizontal and vertical directions. Computation of correction amounts and control of the correction optical systems with respect to the rotation axis (Yaw) in the horizontal direction and the rotation axis (Pitch) in the vertical direction can be implemented by the same processing for the two axes. For this reason, the following description will be made about only one axis.

An A/D converter 121 converts the electrical signal output from the angular velocity sensor 120 into a digital signal and inputs it to a μCOM 150. The captured digital signal is supplied to an HPF (High-Pass Filter) 122 to cut off a low frequency component contained in a shake signal so as to output the high frequency component of the shake signal. Note that the purpose of the HPF 122 is to remove a noise component in the angular velocity sensor 120 and a drift component in a DC voltage generated by temperature characteristics. For this reason, this HPF is not an essential constituent element in this embodiment, and an output from the A/D converter 121 may be directly supplied to a frequency separation HPF (High-Pass Filter) 123.

The frequency separation (signal separation) HPF 123 extracts a high frequency band component from the shake signal detected by the angular velocity sensor 120. A subtraction unit 124 subtracts the high frequency component having passed through the HPF 123 from an original shake signal to generate a low frequency band component contained in the shake signal.

In this manner, the shake signal detected by the angular velocity sensor 120 is separated to generate the first separated shake signal for image stabilization performed by the first correction optical system and the second separated shake signal for image stabilization performed by the second correction optical system. Note that in order to accurately correct the shake detected by the angular velocity sensors by using the two correction optical systems, the first separated shake signal and the second separated shake signal are preferably separated such that the separated signals are complementary to each other and can be restored to the original shake signal when being added to each other. The above arrangement makes a high frequency band shake signal complementary to a low frequency band shake signal. This makes it possible to completely correct the frequency band of the original shake signal even when performing correction by using the two correction optical systems. Note that an LPF may be used in place of the HPF 123 to pass a low frequency component, which is output as one output, and to subtract it from the original signal to generate a high frequency component, which is output as the other output.

The first separated shake signal and the second separated shake signal which are separated by the frequency separation HPF 123 and the subtraction unit 124 are supplied to a sensitivity correction unit 125 and a sensitivity correction unit 135. The sensitivity correction unit 125, an integrator 126, and a saturation prevention control unit 127 constitute a block for computing a control amount for the first correction optical system (shift lens 102) from the first separated shake signal. The sensitivity correction unit 135, an integrator 136, and a saturation prevention control unit 137 constitute a block for computing a control amount for the second correction optical system (zoom lens 103) from the second separated shake signal. Since the two blocks perform the same processing, only the block for computing a control amount for the first correction optical system will be described.

The sensitivity correction unit 125 amplifies the first separated shake signal so as to make it have an amplitude optimal for image stabilization performed by the first correction optical system (that is, the shift lens 102). Note that amplification in this case includes amplification with a gain of ×1 or less. The first separated shake signal amplified by the sensitivity correction unit 125 is supplied to the integrator 126.

The shake signal detected by the angular velocity sensor 120 and the first and second separated shake signals generated by separating the shake signal are angular velocities. In contrast to this, control amounts for the shift lens 102 and the zoom lens 103 are angular displacements. It is therefore necessary to convert angular velocities into angular displacements by time integration. The integrator 126 performs an integration operation of the first separated shake signal and outputs the resultant signal. The integrator 126 performs imperfect integration and can arbitrarily change its time constant.

The saturation prevention control unit 127 limits the control amount generated by the integrator 126 so as to prevent the shift lens 102 from abutting against a mechanical movable end. According to an example of control, the value obtained by limiting an output from the integrator 126 is output as the final control amount (to be also referred to as a drive target position hereinafter) so as not to make a control amount for the first correction optical system exceed a predetermined amount (to be referred to as a limit value hereinafter). In addition, when an output from the integrator 126 approaches a limit value, the control amount is controlled to decrease with a lapse of time by reducing the time constant of the integrator 126. Note that since the sensitivity correction unit 125 amplifies a shake signal, an output from the saturation prevention control unit 127 becomes a control amount suitable for stabilization by using the first correction optical system.

The block for controlling the drive of the first correction optical system (shift lens 102) will be described next.

An A/D converter 134 converts an output signal from a position detection unit 104, which detects the position of the shift lens 102, into a digital signal. A subtractor 128 then subtracts the digital data from a drive target position as an output from the saturation prevention control unit 127. Deviation data as the result is supplied to a control filter 129. In this case, a terminal A 109 and a terminal A 133 are electrically connected to each other.

The control filter 129 is constituted by an amplifier which amplifies input data with a predetermined gain and a phase compensation filter. In the control filter 129, the amplifier and the phase compensation filter perform signal processing on the deviation data supplied from the subtractor 128. The resultant data is output to a pulse width modulation unit 130.

The pulse width modulation unit 130 modulates digital data supplied via the control filter 129 into waveform (that is, a PWM waveform) by changing the duty ratio of the pulse wave, and supplies the modulated data to a motor drive unit 131. A motor 105 is a voice coil motor for driving the shift lens 102. When the motor 105 is driven by the motor drive unit 131, the correction optical system 102 is moved in a direction perpendicular to the optical axis. In this case, a terminal B 110 and a terminal B 132 are electrically connected to each other.

The position detection unit 104 is constituted by a magnet and a Hall sensor mounted at a position facing the magnet. The position detection unit 104 detects the movement amount of the shift lens 102 in a direction perpendicular to the optical axis, and supplies the detection result to the subtractor 128 described above via the A/D converter 134. This forms a feedback control system which makes the position of the shift lens 102 in the direction perpendicular to the optical axis follow a drive target position which is an output from the saturation prevention control unit 127.

A block which controls the driving of the second correction optical system (zoom lens 103) will be described next.

An A/D converter 144 converts an output signal from a position detection unit 106, which detects the position of the zoom lens 103, into a digital signal. A subtractor 138 then subtracts the digital data from a drive target position as an output from a saturation prevention control unit 137. Deviation data as the result is supplied to a control filter 139. In this case, a terminal C 111 and a terminal C 143 are electrically connected to each other.

The control filter 139 is constituted by an amplifier which amplifies input data with a predetermined gain and a phase compensation filter. In the control filter 139, the amplifier and the phase compensation filter perform signal processing on the deviation data supplied from the subtractor 138. The resultant data is output to a pulse width modulation unit 140.

The pulse width modulation unit 140 modulates digital data supplied via the control filter 139 into waveform (that is, a PWM waveform) by changing the duty ratio of the pulse wave, and supplies the modulated data to a motor drive unit 141. A motor 107 is a voice coil motor for driving the zoom lens 103. When the motor 107 is driven by the motor drive unit 141, the zoom lens 103 is moved in a direction perpendicular to the optical axis. In this case, a terminal D 112 and a terminal D 142 are electrically connected to each other.

The position detection unit 106 is constituted by a magnet and a Hall sensor mounted at a position facing the magnet. The position detection unit 106 detects the movement amount of the zoom lens 103 in a direction perpendicular to the optical axis, and supplies the detection result to the subtractor 138 described above via the A/D converter 144. This forms a feedback control system which makes the position of the zoom lens 103 in the direction perpendicular to the optical axis follow a drive target position which is an output from the saturation prevention control unit 137.

The image blur caused by the shake of the image capturing apparatus can be corrected by driving the correction optical system based on the shake signal detected by the angular velocity sensor 120 in this manner.

A block which performs panning control will be described next.

This block includes a panning determination unit 145. The panning determination unit 145 receives, as input signals, the angular velocity data output from the A/D converter 121, the first and second separated shake signals separated by the frequency separation HPF 123 and the subtraction unit 124 or output signals from the integrator 126 and the integrator 136. The panning determination unit 145 then determines the state (execution/non-execution) of a panning operation of the image capturing apparatus based on these input signals.

More specifically, if, for example, the angular velocity data output from the A/D converter 121 or the first or second separated shake signal is equal to or more than a predetermined threshold or angular displacement data as an output signal from the integrator is equal or more than a predetermined threshold, it is determined that the apparatus is in the panning operation state. In this case, the output signal from the A/D converter 121 and the first and second separated shake signals are angular velocities. It is determined whether the panning operation is quick or gradual panning, by determining whether the value of such an angular velocity signal is equal to or more than a predetermined threshold. The panning information (determination result) is then output to a panning control unit 146.

The panning control unit 146 performs panning control in accordance with the determination result from the panning determination unit 145. More specifically, the panning control unit 146 reduces the shake frequency region in which stabilization functions on the high frequency side by gradually increasing the low frequency cutoff frequency of the DC drift removal HPF 122 or the frequency separation HPF 123. Alternatively, the panning control unit 146 gradually reduces the value of the time constant used for the integration operation of the integrator 126 or the integrator 136. With this operation, the stabilization position gradually moves to the central position (the center of correction), and the value of the angular displacement data output from the integrator gradually approaches a reference value (a possible value in the absence of shake). In addition, the panning control unit 146 removes a panning component from the angular velocity data input to the integrators 126 and 136 by subtracting offset signals from the sensitivity correction units 125 and 135 in accordance with an output signal from the integrator 126 or 136. In this manner, the panning control unit 146 changes control amounts for the first correction optical system and the second correction optical system based on the panning information determined by the panning determination unit 145.

Figure 2:
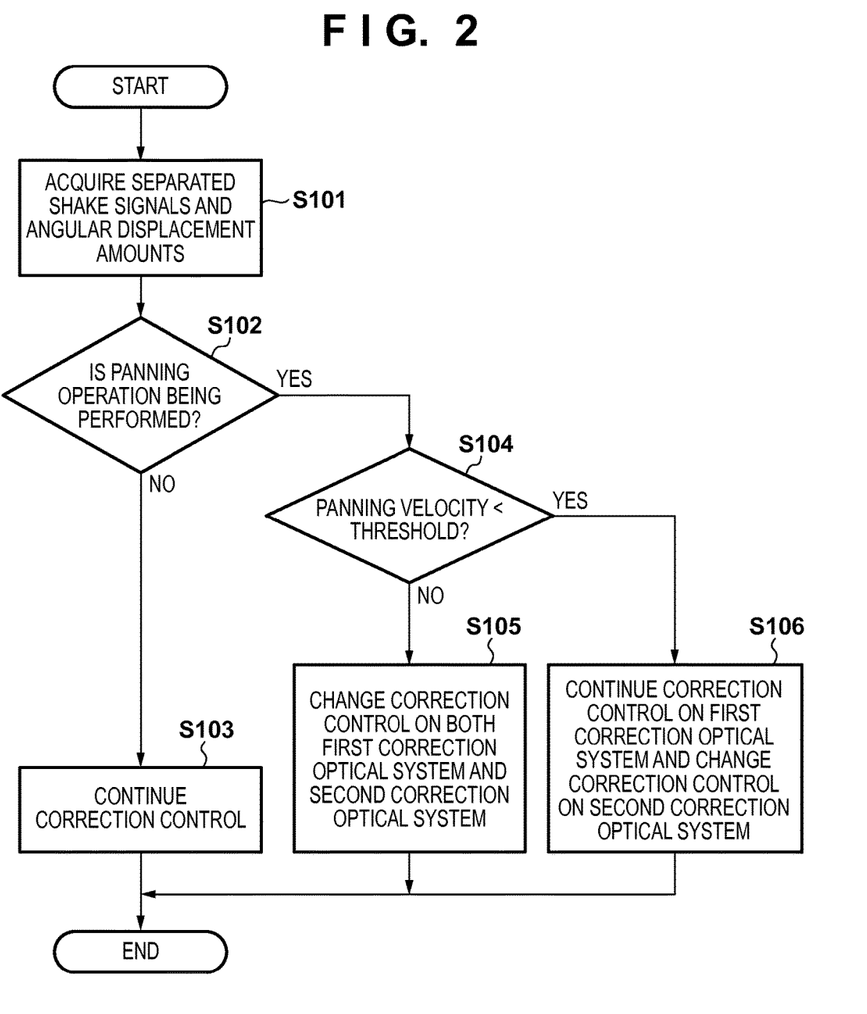
FIG. 2 is a flowchart for explaining control executed by a panning control block according to the first embodiment.

An example of the operation of the panning control block constituted by the panning determination unit 145 and the panning control unit 146 will be described with reference to the flowchart shown in FIG. 2. Note that the processing shown in FIG. 2 is repeatedly executed in an arbitrary predetermined cycle such as 60 Hz, which is a cycle in which the image capturing apparatus captures a one-frame image.

In step S101, the panning determination unit 145 acquires each signal information for determining a panning operation. In step S102, it is determined, based on each input signal information, whether the image capturing apparatus is performing a panning operation. If the image capturing apparatus is not performing a panning operation, the process advances to step S103. If the apparatus is performing a panning operation, the process advances to step S104.

In step S103, the panning control unit 146 continues correction control without any change, and terminates the processing.

In step S104, it is determined whether the panning velocity is equal to or more than a predetermined threshold (gradual/quick panning state). If the panning velocity is equal to or more than a threshold (panning velocity determination), that is, quick panning is performed, the process advances to step S105. If the panning velocity is less than the threshold, that is, gradual panning is performed, the process advances to step S106. Note that it is possible to use, as a panning velocity, each of the values of an output signal from the A/D converter 121 and the first and second separated shake signals, which are angular velocity signals. It is possible to determine whether a panning operation is quick or gradual panning by determining whether each of these angular velocity signals is equal to or more than a predetermined threshold.

In step S105, correction control is changed so as to perform centering concurrently (of both) the first correction optical system and the second correction optical system toward the center, that is, to move the control amount of both the first correction optical system and the second correction optical system to the center of control. In step S106, correction control is changed so as to make the first correction optical system, which corrects a high frequency band component, continue correction control without any change and perform centering of only the second correction optical system, which corrects a low frequency band component, that is, to shift the control amount of the second correction optical system to the center of control.

In this case, an example of each signal information acquired by the panning determination unit 145 in step S101 includes the angular velocity data output from the A/D converter 121, as described above. In addition, such signal information includes angular velocity signals which are the first and second separated shake signals separated by the frequency separation HPF 123 and the subtraction unit 124 and angular displacement amounts corresponding to the first and second separated shake signals output from the integrator 126 and the integrator 136.

The output of each signal waveform based on panning control will be described next with reference to examples of the timing charts of FIGS. 3A to 4E.

Figure 3A:
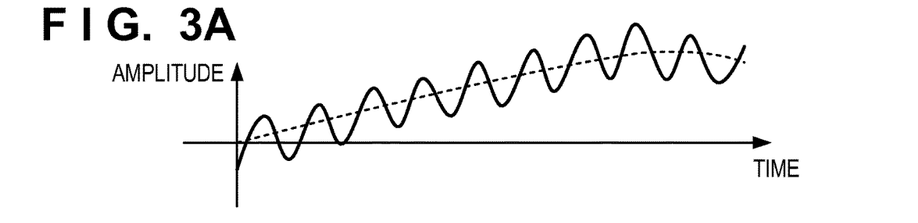
FIGS. 3A to 3E are graphs showing temporal changes in the waveforms of a shake signal and an HPF output signal at the time of gradual panning according to the first embodiment.
Figure 3B:
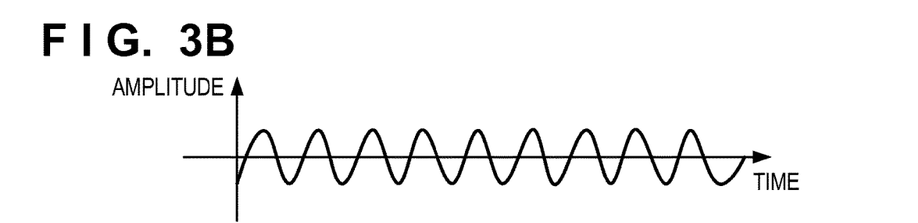
Figure 3C:
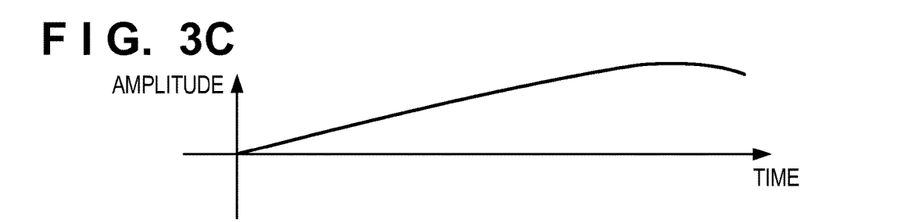
Figure 3D:
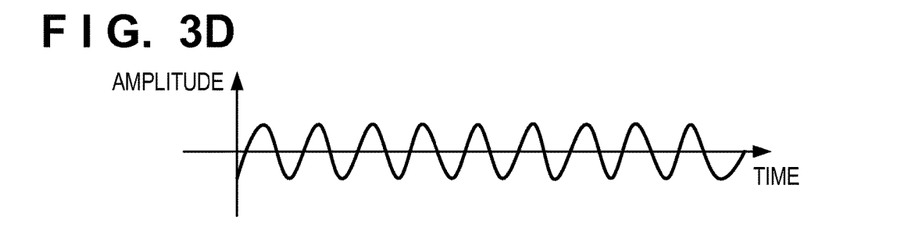
Figure 3E:
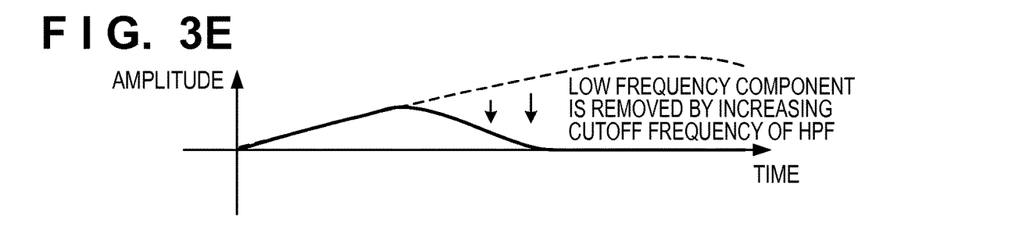

FIGS. 3A to 3E are timing charts showing temporal changes in signal outputs at the time of gradual panning. First of all, the solid line waveform shown in FIG. 3A represents an output signal from the angular velocity sensor 120. This output signal contains a large low frequency component like that indicated by the dotted line, which indicates a gradual panning operation. FIGS. 3B and 3C show a high frequency signal waveform and a low frequency signal waveform separated by the frequency separation HPF 123 when no panning control is performed. That is, they are signal waveforms obtained by simply separating the output signal from the angular velocity sensor, which is shown in FIG. 3A, into a high frequency component and a low frequency component. FIG. 3B shows a signal waveform representing the high frequency component. FIG. 3C shows a signal waveform representing the low frequency component. In contrast, FIGS. 3D and 3E show a high frequency signal waveform and a low frequency signal waveform separated by the frequency separation HPF 123 when a low frequency component is removed by increasing the low frequency cutoff frequency of the DC drift removal HPF 122 by panning control. FIG. 3D shows the first separated shake signal as the high frequency component, which corresponds to FIG. 3B. FIG. 3E shows the second separated shake signal as the low frequency component, which is the waveform obtained by removing a low frequency component by increasing the cutoff frequency. That is, panning control in this embodiment with respect to a gradual panning operation allows the selection of a mode of outputting the signal component detected by the angular velocity sensor 120 without changing the high frequency component to the correction amount computation block of the correction optical system.

Figure 4A:
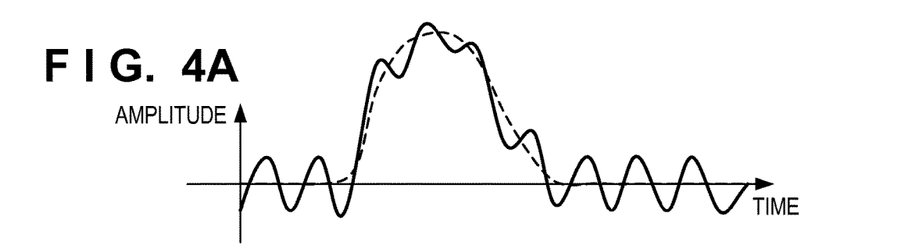
FIGS. 4A to 4E are graphs showing temporal changes in the waveforms of a shake signal and an HPF output signal at the time of quick panning according to the first embodiment.
Figure 4B:
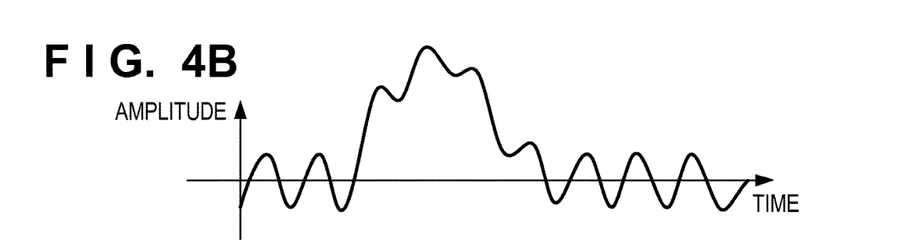
Figure 4C:
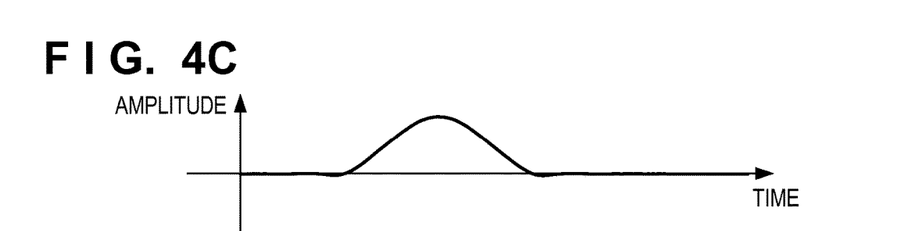

FIGS. 4A to 4E are timing charts showing temporal changes in signal outputs at the time of quick panning. First of all, the solid line waveform shown in FIG. 4A represents an output signal from the angular velocity sensor 120. This output signal contains a large low frequency component like that indicated by the dotted line, which indicates the movement of a quick panning operation. FIGS. 4B and 4C show a high frequency signal waveform and a low frequency signal waveform separated by the frequency separation HPF 123 when no panning control is performed. That is, they are signal waveforms obtained by simply separating the output signal from the angular velocity sensor, which is shown in FIG. 4A, into a high frequency component and a low frequency component. FIG. 4B shows a signal waveform representing the high frequency component. FIG. 4C shows a signal waveform representing the low frequency component. Because of the quick panning operation, the vibration component caused by panning is contained in the high frequency component shown in FIG. 4B.

Figure 4D:
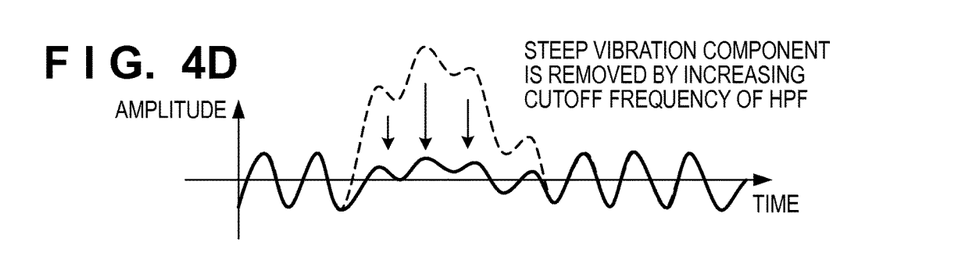
Figure 4E:
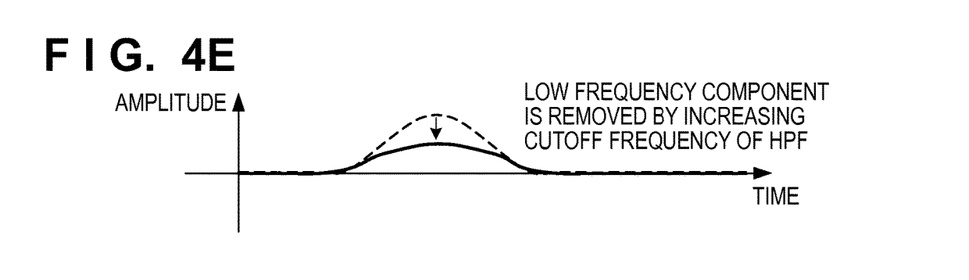

FIGS. 4D and 4E show a high frequency signal waveform and a low frequency signal waveform separated by the frequency separation HPF 123 when a panning component is removed by increasing the low frequency cutoff frequencies of the DC drift removal HPF 122 and the frequency separation HPF 123 by panning control. FIG. 4D shows the first separated shake signal as the high frequency component, which is the waveform obtained by removing the steep vibration component generated by quick panning from the waveform shown in FIG. 4B. FIG. 4E shows the second separated shake signal as the low frequency component, which is the waveform obtained by removing the vibration component caused by panning like a high frequency component. That is, panning control in this embodiment with respect to a quick panning operation is performed to remove panning components contained in both a high frequency component and a low frequency component and output the resultant components to the correction amount computation block of the correction optical system.

In this manner, in panning control, for example, it is possible to suppress an output signal from the frequency separation HPF 123 by increasing the cutoff frequency of the HPF 123. In addition, it is possible to increase the attenuation of a low frequency band component by increasing the cutoff frequency of the DC drift removal HPF 122. This makes it possible to perform centering of the correction optical system by reducing a correction amount.

Note that the panning determination method and panning control method to be used are not limited to the above methods, and other methods may be used. For example, it is possible to use a panning velocity determination method of determining a panning velocity from a detection signal based on a motion vector obtained from a change in image between frames. In addition, for example, it is possible to use a panning control method of attenuating a correction amount by changing the cutoff frequency of the integrator or attenuating a correction amount by subtracting an offset amount from the angular velocity input to the integrator so as to suppress an integrator output.

Note that the centering operation for the correction optical system which is performed in steps S105 and S106 is processing performed with respect to an axis in the operating direction of a shooting operation such as the panning operation or tilting operation of the image capturing apparatus. That is, stabilization processing may be continued with respect to an axis in a direction perpendicular to a panning or tilting direction.

As described above, the system disclosed in this embodiment performs control to attenuate stabilization with respect to a high frequency band component and a low frequency band component at the time of quick panning. In addition, at the time of gradual panning, the system attenuates only stabilization with respect to only a low frequency band component and continues stabilization control with respect to a high frequency band component. This makes it possible, even when camera work movement such as panning occurs, to perform stabilization with respect to a high frequency band component at the time of gradual panning by changing the movement of the two correction optical systems in accordance with the panning velocity. In addition, it is possible to make it difficult to reach an end of correction at the time of quick panning. This can always achieve a good stabilization effect.

Second Embodiment

The second embodiment will be described next. The first embodiment has exemplified the control method of changing the movement of the two correction optical systems in accordance with a panning velocity determination result. The second embodiment will exemplify a method of changing control on the two correction optical systems at the time of panning in accordance with a shooting mode.

Figure 5:
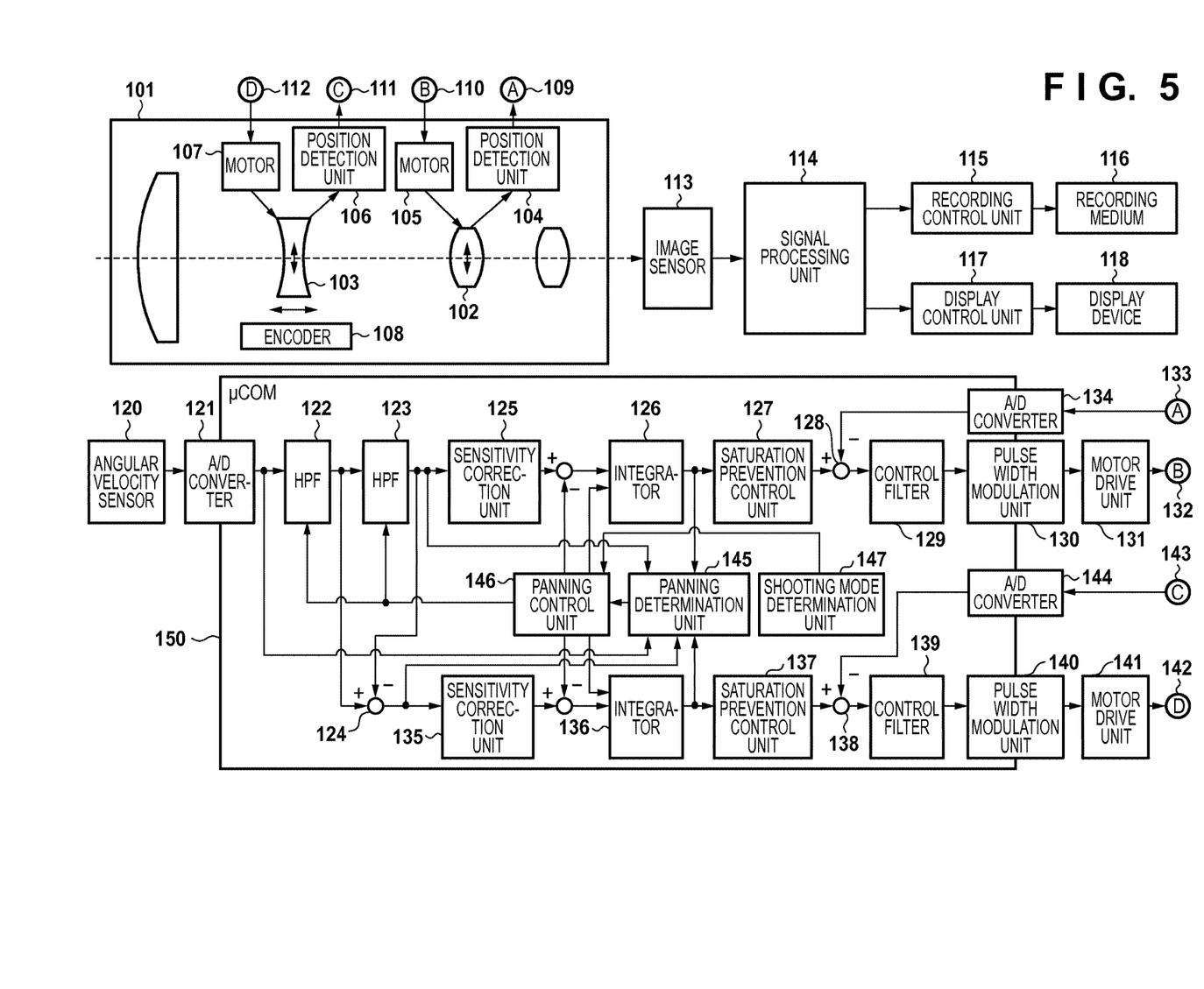
FIG. 5 is a block diagram showing the system configuration of an image capturing apparatus according to the second embodiment.

FIG. 5 is a block diagram showing an example of the arrangement of an image capturing apparatus according to the second embodiment of the present invention. The same reference numerals denote the same parts as those in FIG. 1. Portions of the system in FIG. 5 which differ from those in FIG. 1 will be described next.

The arrangement in FIG. 5 differs from that in the block diagram shown in FIG. 1 in that it includes a shooting mode determination unit 147. The shooting mode determination unit 147 detects a focal length from the encoder value or pulse value based on the zoom lens and determines whether a walking shooting mode is set. The shooting mode determination unit 147 then transfers the determination result information to a panning control unit 146. The panning control unit 146 performs panning control based on the shooting mode information obtained from the shooting mode determination unit 147 and the panning information obtained from a panning determination unit 145.

Figure 6:
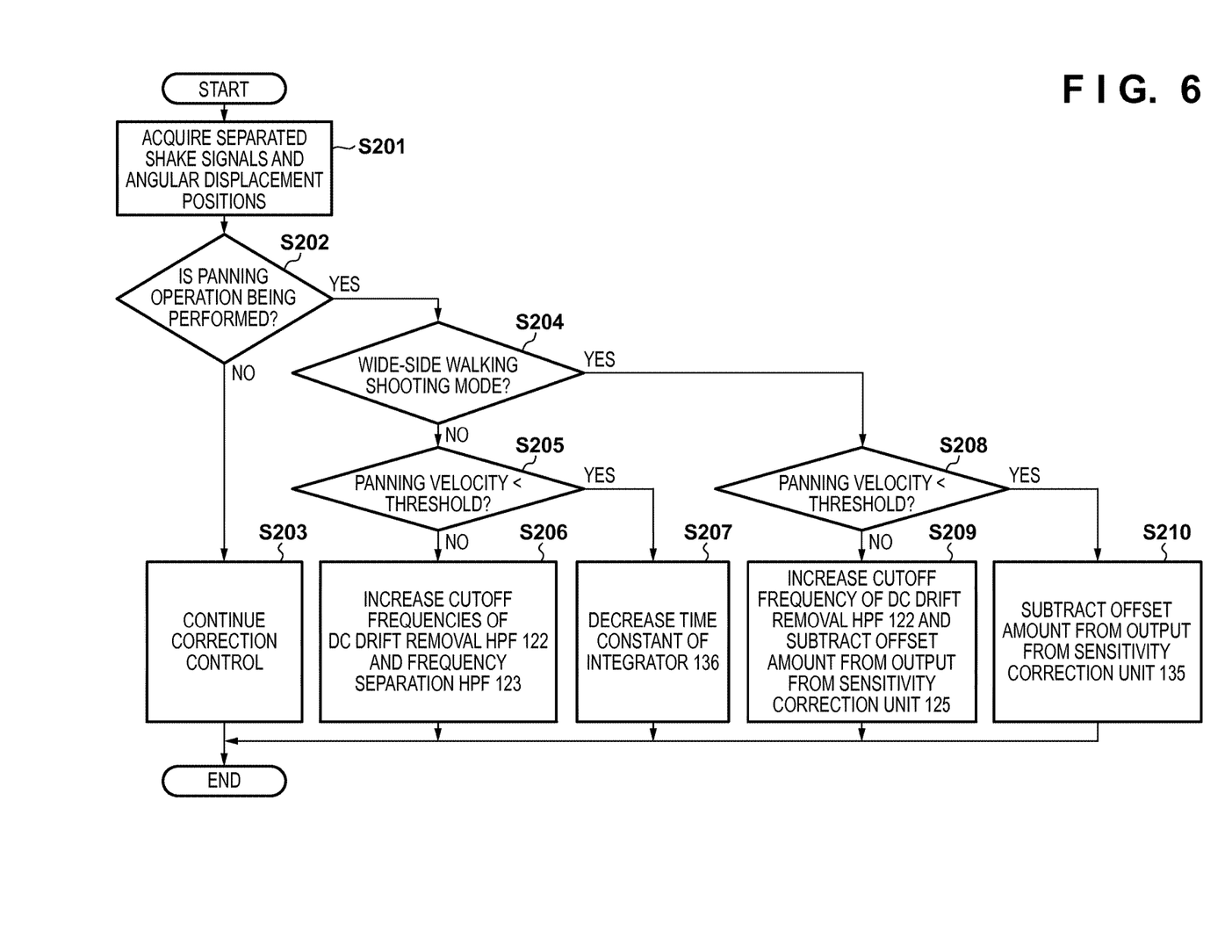
FIG. 6 is a flowchart for explaining control executed by a panning control block according to the second embodiment.

An example of the operation of a panning control block according to this embodiment will be described next with reference to the flowchart shown in FIG. 6. Note that the processing shown in FIG. 6 is also repeatedly executed in an arbitrary predetermined cycle such as 60 Hz, which is a cycle in which the image capturing apparatus captures a one-frame image, as in the flowchart shown in FIG. 2.

In step S201, the panning determination unit 145 acquires each signal information for determining a panning operation. In step S202, it is determined, based on each input signal information, whether the image capturing apparatus is performing a panning operation. If NO in step S202, the process advances to step S203. If YES in step S202, the process advances to step S204.

In step S203, the panning control unit 146 continues correction control without any change, and terminates the processing.

In step S204, it is determined whether the shooting mode detected by the shooting mode determination unit 147 is the walking shooting mode on the wide side relative to a predetermined focal length. If the shooting mode is not the wide-side walking shooting mode, the process advances to step S205. If the shooting mode is the wide-side walking shooting mode, the process advances to step S208.

In step S205, it is determined whether an output signal from an A/D converter 121 and the first and second separated shake signals, which are angular velocity signals, each are equal to or more than a predetermined threshold (gradual/quick panning state). If such an angular velocity signal is equal to or more than the threshold, that is, quick panning is performed, the process advances to step S206. If the angular velocity signal is smaller than the threshold, that is, gradual panning is performed, the process advances to step S207.

In step S206, a low frequency component is removed from the second separated shake signal formed from a low frequency signal by increasing the cutoff frequency of a DC drift removal HPF 122. In addition, a low frequency component is removed from the first separated shake signal formed from a high frequency signal by increasing the cutoff frequency of a frequency separation HPF 123. With this operation, panning control is performed to make both the control amounts of the first correction optical system and the second correction optical system approach the center of control.

In step S207, the time constant of an integrator 136 with respect to the second separated shake signal formed from a low frequency component is decreased to perform centering of only the second correction optical system which corrects a low frequency band component. That is, panning control is performed to make the control amount of the second correction optical system approach the center of control.

In step S208, it is determined whether an output signal from the A/D converter 121 and the first and second separated shake signals, which are angular velocity signals, each are equal to or more than a predetermined threshold (gradual/quick panning state). If such an angular velocity signal is equal to or more than the threshold, that is, quick panning is performed, the process advances to step S209. If the angular velocity signal is smaller than the threshold, that is, gradual panning is performed, the process advances to step S210.

In step S209, a low frequency component is removed from the second separated shake signal formed from a low frequency signal by increasing the cutoff frequency of the DC drift removal HPF 122. In addition, an offset amount is subtracted from an output from a sensitivity correction unit 125 with respect to a high frequency signal to reduce the value of the angular velocity input to an integrator 126 for the first separated shake signal, thereby also reducing the angular displacement amount output from the integrator 126. With this operation, panning control is performed to make both the control amounts of the first correction optical system and the second correction optical system approach the center of control.

In step S210, an offset amount is subtracted from an output from a sensitivity correction unit 135 with respect to a low frequency signal to reduce the value of the angular velocity input to an integrator 136 for the second separated shake signal, thereby also reducing the angular displacement amount output from the integrator 136. With this operation, panning control is performed to make the control amount of the second correction optical system approach the center of control.

As described above, the system disclosed in this embodiment determines whether the wide-side walking shooting mode is set, and also determines whether quick or gradual panning is performed. With this operation, at the time of quick panning in the wide-side walking shooting mode, control is performed to attenuate both stabilization of a high frequency band component and stabilization of a low frequency band component by changing the cutoff frequency of the HPF and subtracting an offset from the angular velocity of a high frequency component. In addition, at the time of gradual panning in the wide-side walking shooting mode, control is performed to continue stabilization of a high frequency band component and attenuate only stabilization of a low frequency band component by subtracting an offset from the angular velocity of a low frequency component.

On the other hand, at the time of quick panning in a mode other than the wide-side walking shooting mode, control is performed to attenuate both stabilization of a high frequency band components and stabilization of a low frequency band component by changing the cutoff frequency of the HPF. In addition, at the time of gradual panning in a mode other than the wide-side walking shooting mode, control is performed to continue stabilization of a high frequency band component and attenuate only stabilization of a low frequency band component by decreasing the time constant of the integrator for a low frequency component. This makes it possible, even when camera work movement such as panning occurs, to perform stabilization of a high frequency band component at the time of gradual panning by changing the movement of the two correction optical systems in accordance with the focal length at the time of shooting, the shooting mode, and the panning velocity. In addition, it is possible to make it difficult to reach an end of correction at the time of quick panning. This can always achieve a good stabilization effect.

Although in this embodiment, the angular displacement amount of each correction optical system is calculated by detecting the angular velocity of shake using the angular velocity sensor and performing integration processing on the detected angular velocity, other shake detection means may be used. For example, the embodiment may be configured to calculate the angular displacement amount of each correction optical system by detecting the acceleration of shake using an acceleration sensor and performing integration on the detected acceleration twice.

In addition, although this embodiment has exemplified the method of correcting the blur of an image to be captured by moving some of the lens groups of the shooting optical system, each as an example of a correction optical system, within a two-dimensional plane perpendicular to the optical axis, the present invention is not limited to this. For example, each correction optical system may be configured to spherically rotate about one point on the optical axis, or, for example, a method of driving a VAP (Variable Angle Prism) or the image sensor in a direction perpendicular to the optical axis may be used. Alternatively, a plurality of schemes may be combined.

In addition, although this embodiment has the structure in which the second optical image stabilization mechanism serves also as a zoom lens, the present invention is not limited to this. For example, one front lens group may be used as the second correction mechanism, or another lens group or its some components may be used as an image stabilization mechanism.

Furthermore, although this embodiment has exemplified the method of performing image stabilization by using the two correction optical systems upon separating a shake signal into two signals, the present invention is not limited to this. A shake signal may be separated into three or more signals, and three or more correction optical systems may be driven to perform image stabilization.

Moreover, although in the second embodiment of the present invention, it is determined whether the current mode is the wide-side walking shooting mode, the embodiment may be configured to switch between panning control modes by determining each shooting mode, as another shooting mode, such as a moving image shooting mode, a still image shooting mode, or a still image preview mode.

Although the present invention has been described in detail above based on its preferred embodiments, the present invention is not limited to these specific embodiments. The present invention incorporates various forms without departing from the scope of the invention. Some features of the above embodiments may be combined as needed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-043155, filed Mar. 5, 2014 and 2014-251075, filed Dec. 11, 2014, which are hereby incorporated by reference herein in their entirety.

What is claimed is:

1. An image stabilization apparatus comprising:
a processor programmed to function as a signal separation unit, a panning determination unit and a control unit, wherein:
the signal separation unit separates a shake signal output from a shake detection unit into a low frequency band shake signal and a high frequency band shake signal;
the panning determination unit determines, based on an output from the shake detection unit, whether a panning operation is performed; and
control unit controls a first image stabilization unit which optically corrects image blur based on the high frequency band shake signal and controls a second image stabilization unit which optically corrects image blur based on the low frequency band shake signal and is different from the first image stabilization unit,
wherein the apparatus has a first mode in which if said panning determination unit determines that a panning operation is performed, control is performed to make the second image stabilization unit approach a center of correction of the second image stabilization unit, and no control is performed to make the first image stabilization unit approach a center of correction of the first image stabilization unit.

2. The apparatus according to claim 1, wherein the apparatus further has a second mode in which if said panning determination unit determines that a panning operation is performed, control is performed to make the second image stabilization unit approach a center of correction of the second image stabilization unit, and control is performed to make the first image stabilization unit approach a center of correction of the first image stabilization unit.

3. The apparatus according to claim 2, wherein said control unit selects the first mode if a panning velocity calculated by said panning determination unit is less than a predetermined threshold, and selects the second mode if the panning velocity calculated by said panning determination unit is not less than the predetermined threshold.

4. The apparatus according to claim 1, wherein control to make the image stabilization unit approach the center of correction includes control to increase a cutoff frequency of a high-pass filter which selects a frequency band of the shake signal.

5. The apparatus according to claim 1, wherein control to make the image stabilization unit approach the center of correction includes control to subtract, from the shake signal, an offset amount by which the image stabilization unit is made to approach the center of correction.

6. An image stabilization apparatus comprising:
a processor programmed to function as a signal unit, a panning determination unit and a control unit, wherein:
the signal separation unit separates a shake signal output from a shake detection unit into a first shake signal and a second shake signal;
the panning determination unit determines, based on an output from the shake detection unit, whether a panning operation is performed; and
the control unit controls a first image stabilization unit which optically corrects image blur based on the first shake signal and controls a second image stabilization unit which optically corrects image blur based on the second shake signal and is different from the first image stabilization unit,
wherein the apparatus has a first mode in which if said panning determination unit determines that a panning operation is performed, control is performed to make the second image stabilization unit approach a center of correction of the second image stabilization unit, and no control is performed to make the first image stabilization unit approach a center of correction of the first image stabilization unit.

7. An image capturing apparatus comprising an image stabilization apparatus defined in claim 1 and an image sensor.

8. An image capturing apparatus comprising an image stabilization apparatus defined in claim 6 and an image sensor.

9. A lens apparatus comprising an image stabilization apparatus defined in claim 1 and the shake detection unit.

10. A lens apparatus comprising an image stabilization apparatus defined in claim 6 and the shake detection unit.

11. A method of controlling an image stabilization apparatus, the method comprising:
a signal separation step of separating a shake signal output from a shake detection unit into a low frequency band shake signal and a high frequency band shake signal;
a panning determination step of determining, based on an output from the shake detection unit, whether a panning operation is performed; and
a control step of controlling a first image stabilization unit which optically corrects image blur based on the high frequency band shake signal and controlling a second image stabilization unit which optically corrects image blur based on the low frequency band shake signal and is different from the first image stabilization unit,
wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

12. A method of controlling an image stabilization apparatus, the method comprising:
a signal separation step of separating a shake signal output from a shake detection unit into a first shake signal and a second shake signal;
a panning determination step of determining, based on an output from the shake detection unit, whether a panning operation is performed; and
a control step of controlling a first image stabilization unit which optically corrects image blur based on the first shake signal and controlling a second image stabilization unit which optically corrects image blur based on the second shake signal and is different from the first image stabilization unit,
wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

13. A non-transitory computer-readable storage medium storing a program for causing a computer to execute a method of controlling an image stabilization apparatus, the method comprising:
a signal separation step of separating a shake signal output from a shake detection unit into a low frequency band shake signal and a high frequency band shake signal;
a panning determination step of determining, based on an output from the shake detection unit, whether a panning operation is performed; and
a control step of controlling a first image stabilization unit which optically corrects imam blur based on the high frequency band shake signal and controlling a second image stabilization unit which optically corrects image blur based on the low frequency band shake signal and is different from the first image stabilization unit,
wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

14. A non-transitory computer-readable storage medium storing a program for causing a computer to execute a method of controlling an image stabilisation apparatus, the method comprising:
a signal separation step of separating a shake signal output from a shake detection unit into a first shake signal and a second shake signal;
a panning determination step of determining, based on an output from the shake detection unit, whether a panning operation is performed; and
a control step of controlling a first image stabilization unit which optically corrects image blur based on the first shake signal and controlling a second image stabilization unit which optically corrects image blur based on the second shake signal and is different from the first image stabilization unit,
wherein the method has a first mode in which if it is determined in the panning determination step that a panning operation is performed, control is performed to make the second image stabilization unit approach a center of correction of the second image stabilization unit, and no control is performed to make the first image stabilization unit approach a center of correction of the first image stabilization unit.

* * * * *